US006610958B2

(12) United States Patent
Stricklen

(10) Patent No.: US 6,610,958 B2
(45) Date of Patent: Aug. 26, 2003

(54) APPARATUS AND METHOD FOR FEEDING FILLER WIRE IN A WELDING OPERATION

(75) Inventor: Gary A. Stricklen, Burlingame, CA (US)

(73) Assignee: Precision Welding Technologies, Inc., Auburn, CA (US)

( * ) Notice: Subject to any disclaimer, the term of this patent is extended or adjusted under 35 U.S.C. 154(b) by 0 days.

(21) Appl. No.: 10/004,398

(22) Filed: Oct. 30, 2001

(65) Prior Publication Data

US 2002/0158048 A1 Oct. 31, 2002

Related U.S. Application Data

(60) Provisional application No. 60/286,594, filed on Apr. 25, 2001.

(51) Int. Cl.$^7$ .............................. B23K 9/16; B23K 5/22
(52) U.S. Cl. ........................... 219/75; 219/75; 228/247; 228/256; 228/41
(58) Field of Search .................... 219/75; 228/245–247, 228/256, 33, 41

(56) References Cited

U.S. PATENT DOCUMENTS

| 2,360,160 A | * | 10/1944 | Pickhaver | ............. 219/124.03 |
| 2,681,401 A | * | 6/1954 | Anderson | ............. 219/137.2 |
| 3,797,725 A | * | 3/1974 | Mori et al. | ................ 228/41 |
| 3,990,620 A | | 11/1976 | Gellner et al. | |
| 4,102,483 A | | 7/1978 | Ueyama et al. | |
| 4,143,257 A | | 3/1979 | Herrmann | |
| 4,160,151 A | | 7/1979 | Tonita | |
| 4,206,862 A | | 6/1980 | DaCosta | |
| 4,344,553 A | | 8/1982 | Lesher et al. | |
| 4,493,449 A | * | 1/1985 | Kleiman | ...................... 228/7 |
| 4,532,406 A | | 7/1985 | Povlick | |
| 4,650,959 A | | 3/1987 | Swensrud et al. | |
| 5,146,062 A | | 9/1992 | Koda et al. | |
| 5,379,941 A | | 1/1995 | Partel | |
| 6,057,526 A | | 5/2000 | Lee | |
| 6,127,651 A | * | 10/2000 | Burgoon et al. | ........ 219/137 R |

FOREIGN PATENT DOCUMENTS

| JP | 55048479 A | * | 4/1980 |
| JP | 58086982 A | * | 5/1983 |

OTHER PUBLICATIONS

Parker, "McGraw–Hill Dictionary of Scientific and Technical Terms", 1989, McGraw–Hill Book Company, Fourth Edition, p. 807.*

* cited by examiner

*Primary Examiner*—M. Alexandra Elve
*Assistant Examiner*—Kevin McHenry
(74) *Attorney, Agent, or Firm*—Dorsey & Whitney LLP

(57) ABSTRACT

An apparatus (105) and method are provided for feeding wire (135) to a tip (120) of a torch (115) in a welding system (100). The apparatus (105) includes a drive mechanism (150) attached to the torch (115), and a guide assembly (155) attached to the drive mechanism. The guide assembly (155) includes a bracket (180) by which it is attached to the drive mechanism (150), a wire guide (185) through which the wire (135) is passed, and first and second adjustors (270A, 270B) to position the wire guide relative to the tip (120). The guide assembly (155) is configured to pass the wire (135) in a straight line from the drive mechanism (150) to the tip (120). In one embodiment, the adjustors (270A, 270B) include gimbals (275) supporting the wire guide (185). Each gimbal (275) is attached to a screw (280) passing through an opening in an arm (285) projecting from the bracket (180) of the guide assembly (155). Adjusting knobs (290) engaging a portion of the screw (280) extending through the opening adjust the length of the screw between the gimbal (275) and the arm (285).

17 Claims, 5 Drawing Sheets

APPARATUS AND METHOD FOR FEEDING FILLER WIRE IN A WELDING OPERATION

CROSS REFERENCE TO RELATED APPLICATION

This application claims priority from U.S. Provisional Patent Application Serial No. 60/286,594, (Attorney docket number P-70223/AJT/WEN) entitled an APPARATUS AND METHOD FOR FEEDING FILLER WIRE IN A WELDING OPERATION, filed Apr. 25, 2001.

FIELD OF INVENTION

This invention pertains generally to welding systems, and more particularly to an apparatus and method for feeding weld wire to a welding tip of a welding torch in a welding system

BACKGROUND

Welding wire feed apparatuses, commonly known as wirefeeders, are widely used in a automated and semi-automated welding operations to feed filler wire to a molten pool on a workpiece being heated by a welding torch on a welding system to form a weld.

A conventional, prior art wirefeeder will now be described with reference to FIG. 1. FIG. 1 is a diagrammatic illustration showing a cross-sectional side view of a welding system 10 having a conventional wirefeeder 12. Referring to FIG. 1, a conventional wirefeeder 12 includes a filler wire supply 14, such as a spool, on which filler wire 16 is stored, a wirefeed mechanism 18 mounted to the welding system 10, a wire liner or conduit 20 through which the filler wire is passed from the wirefeed mechanism to an adjustment mechanism 22 attached to a welding torch 24 on the welding system. The adjustment mechanism 22 positions a wire guide 26 through which the filler wire 16 is passed to location or point near to the welding torch 24. Typically, the wirefeed mechanism 18 includes an electric motor 28 driving one or more gears or drive wheels (not shown) that engage the filler wire 16 forcing it through the conduit 20 to the adjustment mechanism 22. The wirefeed mechanism 18 can be operated manually by an operator, or automatically by a controller (not shown) to synchronize feeding of the filler wire 16 to movement of a workpiece (not shown) being welded on the welding system 10.

A disadvantage of conventional wirefeeders 12 is that complicated and cumbersome adjustment mechanisms 22 make it difficult to precisely position the wire guide 26 in relation to the welding torch 24 or workpiece. One commonly used adjustment mechanism 22 involves the use of a number of interconnected dovetail slides or sliding members repositioned by thumbscrews 28. A first dovetail slide allows the wire guide 26 to be moved up and down vertically in relation to the welding torch 24. A second dovetail slide depending from the first allows the wire guide 26 to be moved horizontally, and a third dovetail slide depending from the second allows the wire guide to be moved in and out relative to the welding torch 24. Because the slides are interconnected, adjustment of any one of them can necessitate repositioning of the others, which in turn can lead to the need to reposition the first slide and so on. The adjustment procedure is often made even more difficult by the use of fasteners on the slides which require a wrench, screwdriver or other tool to tighten.

A related problem with the adjustment mechanism 22 of conventional wirefeeders 12 is that it is often difficult or impossible to efficiently or subtly adjust the angle at which the filler wire enters the molten pool on the workpiece, commonly known as the wire entry angle. The entry angle is important because if the filler wire is fed into the molten pool too low, i.e., at too shallow an angle relative to the surface of the workpiece, it can hit the workpiece before entering the molten pool, causing the workpiece to wobble, or the filler wire to stick to the surface of the workpiece. On the other hand, if the wire comes in too high, i.e., at too large an angle relative to the surface of the workpiece, the heat from the welding torch can cause the end of filler wire "ball up" or burn back without contacting the molten pool. For example, the entry angle for an automated Gas Tungsten Arc Welding (GTAW) welding operations is from about 14 to about 40 degrees relative to the horizontal plane. However, possible entry angles are often constrained by a number of circumstances including workpiece configuration, welding system or process setup, and interference with tooling used to position the workpeice. This is particularly a problem with conventional wirefeeders 12, which are generally designed to provide a single, fixed entry angle determined by the mounting or attachment of the wire guide 26 to the adjustment mechanism 22 that can be changed little if at all, and then only with great difficulty.

Yet another problem with conventional wirefeeders 12 is that the weight of the adjustment mechanism 22 and the wireguide 26, which is not in-line with a centerline of a main body or support structure of the welding system 10, often results in wobbling during the welding operations leading to filler wire deposition irregularities. These irregularities are magnified in a multi-pass buildup processes in which as the filler wire is welded to that deposited on a previous pass to form a flange or knife edge of deposited metal. This situation is exacerbated by adjustment mechanisms, such as the dovetail slides (not shown), in which the brackets and interconnections of components of the adjustment mechanism project a significant distance from the centerline of the main body of the welding system 10. Moreover, conventional prior art wirefeeders typically encompass a single contiguous adjustment mechanism 22 for both fine and course adjustments making fine adjustments difficult. The above is true of all welding operations, including only those in which the welding torch is moved over the workpiece and those in which the workpiece moved under the welding torch.

In addition to the difficulties with the adjustment mechanism and procedure, another significant problem with conventional wirefeeders is the complex and circuitous path the filler wire must take within the conduit from the wirefeed mechanism to the adjustment mechanism. This complex and circuitous path causes binding or constriction of filler wire within the conduit resulting in non-uniform feeding of the filler wire and leading to deposition inconsistencies in the weld. This is particularly a problem for wirefeeders in which the wirefeed mechanism uses gears to engage and drive the filler wire. The gears score the surface of the filler wire producing sharp or rough edges that catch on the inner surface of the conduit, resulting in sharp or rough edges on the inner surface of the conduit that further impede movement of the filler wire through the conduit. One approach to dealing with this shortcoming in conventional wirefeeders involves the regular replacement of the conduit. However, this is not a wholly satisfactory solution since, in addition to the expense and lost operating time of the welding system, it is generally sometime before need to replace the conduit is recognized, and in the meantime binding of the filler wire will lead to welds with deposition inconsistencies necessitating costly reworking or replacement of numerous workpieces.

A related problem involves the juncture between the conduit and the wire guide. The filler wire supply is generally not in-line with the wire guide and because the wire guide is moved during the adjustment procedure prior to the welding operation, if not during the welding operation itself, the conduit can form a sharp bend at this point leading to binding or constriction of filler wire within the conduit.

Accordingly, there is a need for a wirefeeder and method for feeding filler wire to a welding tip of a welding torch in a welding system that reduces or eliminates binding or constriction of the filler wire whereby deposition inconsistencies are reduced or eliminated. There is a need for a wirefeeder and method that reduce or eliminate wobbling by the wirefeeder whereby irregularities in welding are reduced or eliminated. There is yet a further need for a wirefeeder and method that provides a straightforward adjustment mechanism for easy positioning of the wire guide, including easy adjustment of wirefeed entry angles over a wide range of angles.

SUMMARY

The present invention provides an apparatus and method for feeding welding or filler wire to a welding tip of a welding torch in a welding system.

In one aspect, the invention is directed to a wire guide assembly or wire guide apparatus having a supply spool on which the filler wire is stored, a drive assembly or drive mechanism attached by a mounting arm to the welding torch of the welding system, a wire liner or conduit through which the filler wire is passed extending from a location near to the supply spool to the drive mechanism, and a guide assembly attached to the drive mechanism to convey the filler wire from the drive mechanism to a point near the welding tip of the welding torch. Generally, the guide assembly is configured so that the filler wire is passed in a substantially straight line from the drive mechanism to a point proximal to the welding tip of the welding torch. The guide assembly includes a bracket by which the guide assembly is attached to the drive mechanism, a wire guide through which the filler wire is passed, and first and second adjustors attached to the bracket of the guide assembly to position the wire guide relative to the welding tip. The first adjustor and the second adjustor are adapted to move the wire guide along axes perpendicular to one another and to a longitudinal axis of the wire guide.

In one embodiment, the first and the second adjustors include gimbals supporting the wire guide. Each of the gimbals is attached to a threaded screw passing through an opening in an arm projecting from the bracket of the guide assembly. Adjusting knobs threadably engaging a portion of each of the screws extending through the openings enable the length of the screws between the gimbal and the opening to be adjusted.

In another embodiment, the mounting arm attaching the drive mechanism to the welding torch includes a bracket attached to the welding torch and a tube member attached the drive mechanism. The tube member is in sliding engagement with the bracket to vary the position of the drive mechanism and the guide assembly relative to the welding torch. The tube member is curved or arced to change the angle formed by an axis of the filler wire and the welding torch, commonly known as the wire entry angle. Preferably, the tube member is curved or arced to provide entry angles ranging from about 10 to about 40 degrees, and more preferably, the tube member is curved or arced to provide entry angles ranging from about 14 to about 32 degrees.

Most preferably, components of the wire guide apparatus, i.e., the drive mechanism, guide assembly, and mounting arm are adapted to provide a "home" position having an entry angle of from about 14 to about 17 degrees depending on a size or thickness of the filler wire. For example, for filler wire having diameters of 0.035" or more, 17 degrees is considered by many to be optimum wirefeed entry angles for precise, automated Gas Tungsten Arc Welding (GTAW) applications. For smaller filler wire sizes such as 0.020" wire, 14 degrees is preferred.

In yet another embodiment, the conduit is a rigid conduit and the supply spool is positioned in relation to the drive mechanism so that it follows a substantially straight path between the supply spool and the drive mechanism. Alternatively, the conduit is a flexible conduit, and the feed apparatus further including a pulley attached to the drive mechanism to allow the drive mechanism to be positioned independent of the supply spool, including positioned on an opposite side of the welding torch from the supply spool.

The wire guide apparatus of the present invention is particularly useful in arc welding systems, such as GTAW systems and Plasma Arc Welding (PAW) systems, and may be useful in electron beam welding (EBW) and laser beam welding (LBW) systems.

In another aspect, the invention is directed to a method of feeding filler wire in a welding system having a welding torch with a welding tip for welding a workpiece using the wire guide apparatus of the present invention. In the method, the filler wire is drawn or pulled from a supply using a drive mechanism attached by a mounting arm to the welding torch. The filler wire is then conveyed from the drive mechanism to the welding tip of the welding torch using a wire guide attached by a bracket to the drive mechanism, the wire guide having a distal end located proximal to the welding tip. The position of the wire guide relative to the welding tip is positioned using first and second adjustors attached to the bracket of the wire guide apparatus.

In one embodiment, the wire guide apparatus has a substantially straight passage through which the filler wire is passed from the drive mechanism, and the step of conveying the filler wire from the drive mechanism to the welding tip of the welding torch involves conveying the filler wire in a substantially straight line from the drive mechanism to the welding tip of the welding torch.

In another embodiment, the first and the second adjustors include gimbals supporting the wire guide, arms attached to the bracket of the guide assembly, and threaded screws attached to the gimbals and extending from the gimbals and through openings in the arms. Length of the screws between the gimbals and the openings are adjusted by turning adjusting knobs threadably engaging a portion of the screws extending through the openings, thereby adjusting the position of the wire guide relative to the welding tip.

Optionally, the wire guide apparatus further includes a controller for controlling operation of the drive mechanism, and the method includes the further step of automatically advancing the filler wire in relation with movement of the welding tip over a workpiece. Preferably, the controller is adapted to advance the filler wire at a first predetermined rate and retract the filler wire at a second, lesser predetermined rate, and the step of automatically advancing the filler wire includes the steps of advancing the filler wire at the first predetermined rate and retracting it at the second predetermined rate.

In yet another aspect, the invention is directed to a welding system for welding a workpiece. The welding system includes a welding torch having a welding tip for heating and forming a weld on the workpiece, and a wire guide apparatus according to the present invention. The wire guide apparatus includes drive means for moving weld wire from a weld wire supply to a location proximal to a welding tip of a welding torch, guide means for positioning the wire guide relative to the welding tip, the guide means attached to the drive means, and adjustment means for adjusting the position of the wire guide relative to the welding tip. Generally, the drive means is attached to the welding torch at a point or location near the welding tip.

In one embodiment, the guide means includes a wire guide through which the filler wire is passed, the wire guide attached by a bracket to the drive means and having a distal end located proximal to a welding tip of the welding torch. Preferably, in one version of this embodiment the adjustment means includes a first adjustor and a second adjustor attached to the bracket to position the wire guide relative to the welding tip, the first and second adjustors are adapted to move the wire guide along axes perpendicular to one another and to a longitudinal axis of the wire guide. More preferably, at least one of the adjustors include a gimbal supporting the wire guide, an arm attached to the bracket of the guide means, a threaded screw attached to the gimbal and extending from the gimbal and passing through an opening in the arm, and an adjusting knob adapted to adjust length of the screw between the gimbal and the opening in the arm.

The advantages of a wire guide apparatus of the present invention include: (i) a wire guide that provides a straight path for filler wire from a drive mechanism to a molten pool on a workpiece; (ii) elimination of wobbling by the wire guide apparatus whereby irregularities in welding are reduced or eliminated; (iii) straightforward positioning adjustment mechanism for easy positioning of the wire guide; (iv) variable and easily adjustable wirefeed entry angles; and (v) elimination of binding or constriction of weld wire whereby deposition inconsistencies are reduced or eliminated.

BRIEF DESCRIPTION OF THE DRAWINGS

These and various other features and advantages of the present invention will be apparent upon reading of the following detailed description in conjunction with the accompanying drawings, where.

DETAILED DESCRIPTION

The present invention is directed to an apparatus and method for feeding filler wire to a welding tip of a welding torch in a welding system.

In the following description numerous embodiments of the apparatus and method of the present invention are described with reference to a Gas Tungsten Arc Welding (GTAW) system or TIG (tungsten inert gas) welding system. It will be appreciated, however, by one skilled in the art that the present invention can be practiced with any number of different welding systems using different welding technologies including Plasma Arc Welding (PAW) systems, and may be useful in electron beam welding (EBW) and laser beam welding (LBW) systems.

Figure 1:
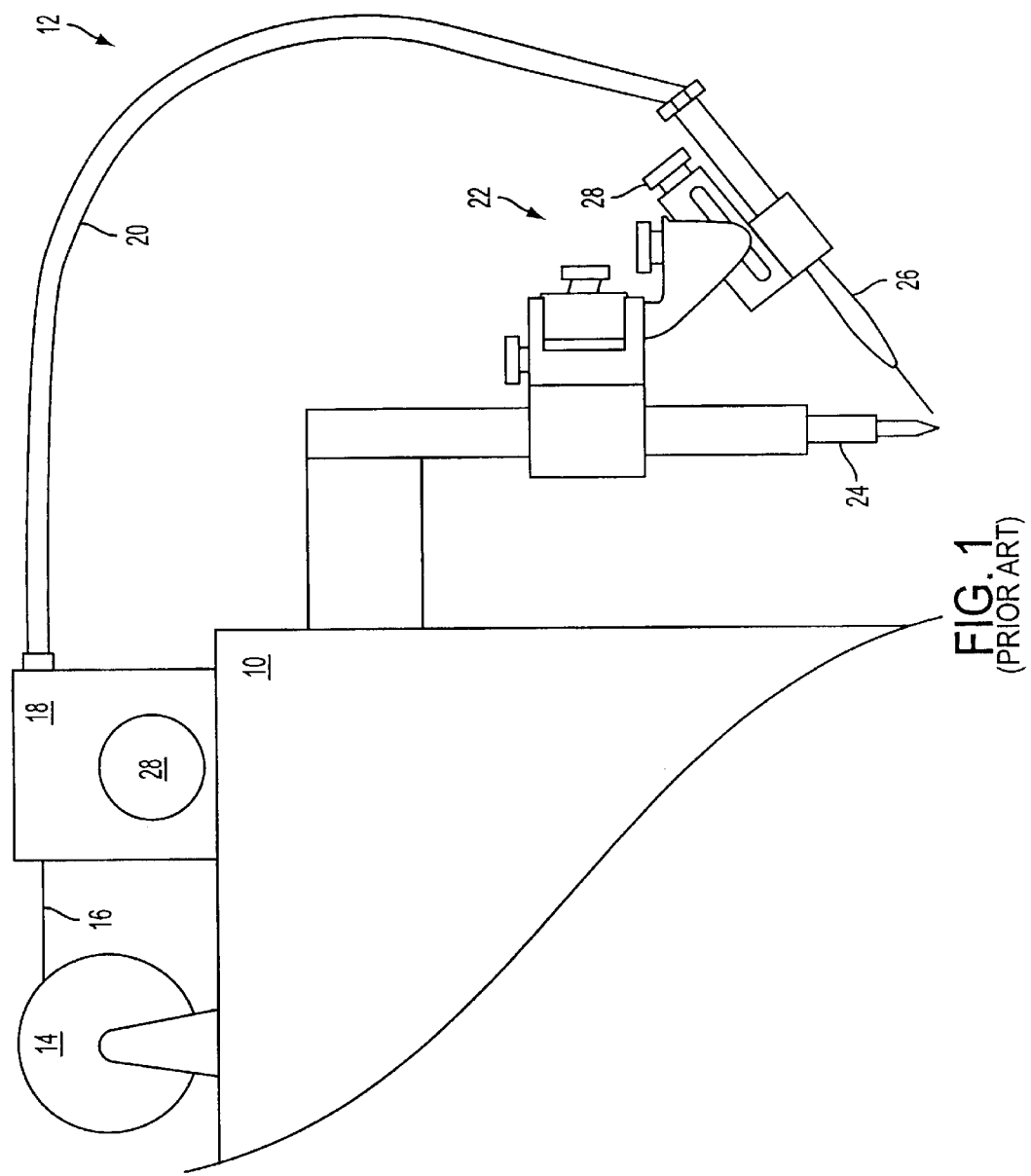
FIG. 1 (prior art) is a diagrammatic illustration showing a side view of a welding system having a prior art wirefeeder.
Figure 2:
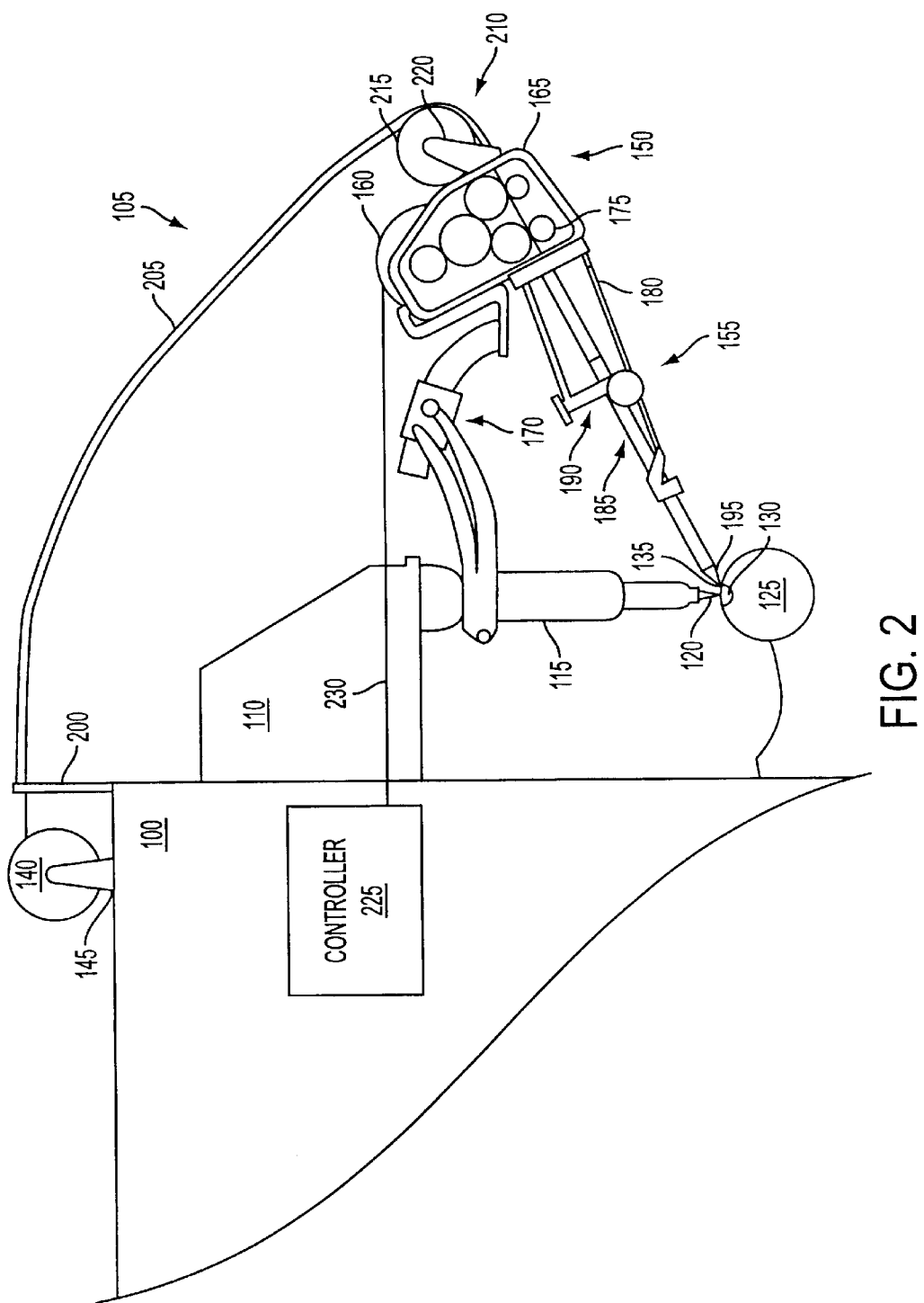
FIG. 2 is a diagrammatic illustration showing a side view of a welding system having a wire guide apparatus according to an embodiment of the present invention.

FIG. 2 shows an exemplary block diagram of a welding system 100, here a GTAW or TIG system, for which a welding wire feed apparatus or wire guide apparatus 105 and method according to an embodiment of the present invention are particularly useful. For purposes of clarity, many of the details of welding systems that are widely known and are not relevant to the present invention have been omitted. Welding systems are described in more detail in, for example, U.S. Pat. No. 5,393,949, which is incorporated herein by reference. Essentially, the welding system 100 includes a traveling carriage 110 supporting an appropriate welding head or torch 115. In the GTAW welding system 100 shown, the welding torch 115 includes a tungsten electrode having a welding tip 120. Welding is accomplished using the concentrated heat from an electric arc formed between the welding tip 120 and a workpiece 125 or workpieces electrically connected by a ground cable to a power supply in the welding system. The traveling carriage 110 is moved over the workpiece 125 to form a molten pool 130 thereon. During the welding process or operation, additional material, filler wire 135, is added to the molten pool 130 on the workpiece 125 using the wire guide apparatus 105 and method of the present invention.

The wire guide apparatus 105 generally includes a source or supply of filler wire 135, such as a supply spool 140 attached by a bracket 145 to the welding system 100, a drive mechanism 150 attached to the welding torch 115 to pull or draw filler wire from the supply spool, and a guide assembly 155 attached to the drive mechanism to guide the filler wire to the molten pool 130 on the workpiece 125. The drive mechanism 150 includes a motor 160, such as an electric, pneumatic or hydraulic motor, to provide the motive force for pulling the filler wire 135 from the supply spool 140, a gearbox or casing 165 attached to the welding torch 115 by a mounting arm 170, and to which the motor is mounted or attached. The casing 165 encloses a number of drive wheels or gears 175 that are driven by the motor 160 and are adapted to engage the filler wire 135 to pull it from the supply spool 140. The guide assembly 155 includes a frame/bracket 180 by which it is attached to the casing 165 of the drive mechanism 150, a wire guide 185 through which the filler wire 135 is passed, and an adjustment means or mechanism 190 adapted to adjust a position of a distal end or tip 195 of the wire guide relative to the tip 120 of the welding torch 115.

Optionally, the filler wire 135 is carried or conveyed from a fixture 200 near the supply spool 140 to drive mechanism 150 by a hollow cable or conduit 205. The conduit 205 can comprise either a rigid conduit that follows a substantially straight line between the supply spool 140 and the drive mechanism 150 (not shown), or a flexible conduit that enables the supply spool and the drive mechanism to be located as shown. Preferably, in this later embodiment, the wire guide apparatus 105 further includes a pulley assembly 210 having a pulley 215 attached to the drive mechanism 150 by an articulated bracket 220. By articulated it is meant that the bracket 220 is attached to the casing 165 such that it rotates about an axis that coincides with an opening (not shown) through which the filler wire 135 enters the casing. This arrangement enables the pulley 215 to receive the conduit 205 from virtually any direction and convey the filler wire 135 into the casing 165 along a substantially straight path that is tangential to the pulley.

In yet another optional embodiment, the wire guide apparatus 105 further includes a controller 225 coupled to the motor 160 by a control line 230. The controller 225 is adapted to operate in conjunction with a control apparatus (not shown) of the welding system 100 to control operation of the motor 160 to synchronize the advancing or movement of the filler wire 135 with movement of the workpiece 125 or to achieve a desired rate of deposition. In one version of this embodiment, the controller 225 is adapted to advance the filler wire 135 at a first predetermined rate and retract the filler wire at a second predetermined rate, and wherein the second predetermined rate is less than the first predetermined rate. The first and second predetermined rates are dependent on many factors including metal fluidity of the workpiece and the filler wire 135, and joint/buildup design, and the present invention is not dependent on their precise values. However, it is important that the controller 225 always advance the filler wire 135 at a rate greater than retracting it, and that the filler wire 135 advance and retract accurately from a mechanical standpoint, since the predetermined speeds are based on desired weld characteristics. Thus, a significant advantage of the wire guide apparatus 105 and method of the present invention is that there is less mechanical constriction than in prior art wirefeeders. Therefore, an operator is much more likely to obtain the programmed first and second predetermined rates using the controller 225 and the wire guide apparatus 105 of the present invention than with a conventional prior art wirefeeder.

For example, if the programmed forward speed is 75.0 is (IPM) and the retract speed is −25.0 IPM with a high pulsation time of 0.10 seconds and a low pulsation time of 0.20 seconds, then the operator wants the actual forward and reverse speeds, 75 IPM and −25 IPM repsectively, to be the same on every pulse of the filler wire 135 to provide deposition consistency. If this does not occur due to constriction in the guide tube or other part of a conventional wirefeeder having a poor design, the result will be an inconsistent weld buildup, or potentially weld defects, such as undercut, lack of fusion, and/or insufficient bead width.

Please note though, not all filler wire 135 feed processes utilize retract, some continually feed the filler wire 135 in a positive direction, although our apparatus will still provide more consistency and repeatability than prior art for this mode of filler wire 135 delivery, as well.

Figure 3:
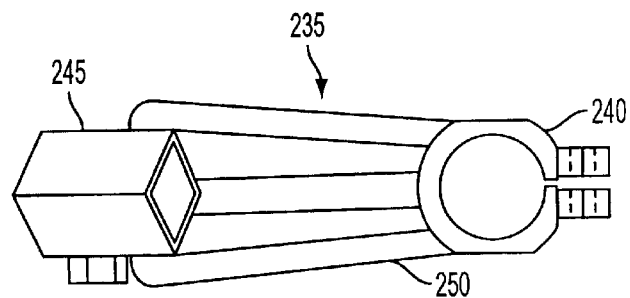
FIG. 3 is a diagrammatic illustration showing a top perspective view of a bracket of a mounting arm of a wire guide apparatus according to an embodiment of the present invention.
Figure 4:
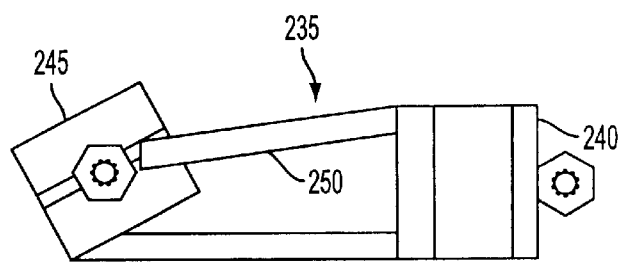
FIG. 4 is a diagrammatic illustration showing a side view of the bracket of FIG. 3.

The wire guide apparatus 105 will now be described in greater detail with reference to FIGS. 3 to 7. FIG. 3 is a diagrammatic illustration showing a top perspective view of an embodiment of a bracket 235 of the mounting arm 170 by which the drive mechanism 150 is attached to the welding torch 115. Referring to FIG. 3, the bracket 235 includes a clamp 240 by which it is attached to the welding torch 115, a box shaped fitting 245, and a number of braces or frame members 250 joining the clamp to the box shaped fitting. Preferably, the bracket 235 includes three frame members 250 arranged to define a number of triangular structures, thereby providing a bracket 235 that is both light and substantially more rigid than mounting brackets used in conventional wirefeeders 105. The box shaped fitting 245 is adapted for receiving a tubular member (not shown in this figure) to which the casing 165 of the drive mechanism is attached. Bolts (not shown) or other fasteners are used to tighten the clamp 240 to the welding torch 115, and to secure the tubular member in the box shaped fitting 245. FIG. 4 is a side view of the bracket of FIG. 3 showing another of the triangular structures defined by the frame members 250.

Figure 5:
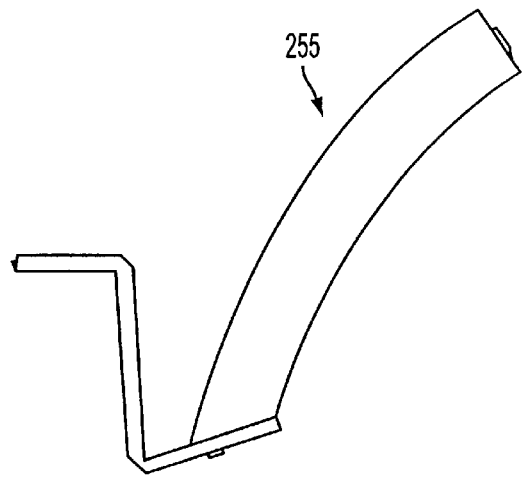
FIG. 5 is a diagrammatic illustration showing a side view of a tube member of a mounting arm of a wire guide apparatus according to an embodiment of the present invention.

FIG. 5 is a diagrammatic illustration showing a side view of a tube member 255 of the mounting arm 170 of the wire guide apparatus 105 according to an embodiment of the present invention. The tube member 255 in sliding engagement with the bracket to vary the position of the drive mechanism 150 and the guide assembly 155 relative to the welding torch 115. Preferably, the tube member 255 is curved or arced as shown to change an entry angle formed by an axis of the wire guide 185 relative to a horizontal plane. More preferably, the drive mechanism 150, the wire guide apparatus 150, and the mounting arm 170, including the tube member, are adapted to provide entry angle adjustable between from about 10 to about 40 degrees. Most preferably, the drive mechanism 150, the wire guide apparatus 150, and the mounting arm 170 are adapted to provide an entry angle of about 17 degrees in a neutral or unadjusted home position, 17 degrees being the optimum entry angle for precise, automated GTAW applications.

Figure 6:
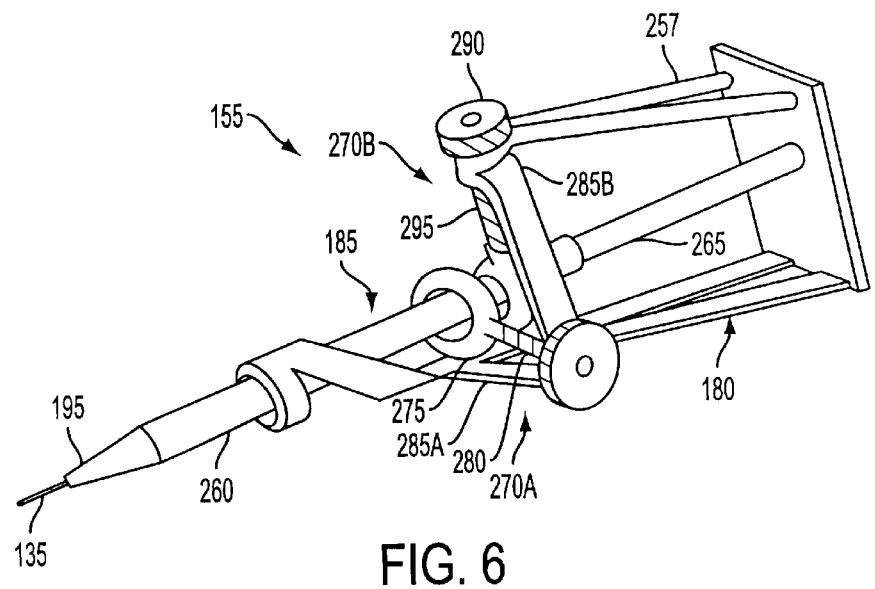
FIG. 6 is a diagrammatic illustration showing a side perspective view of a guide assembly according to an embodiment of the present invention.
Figure 7:
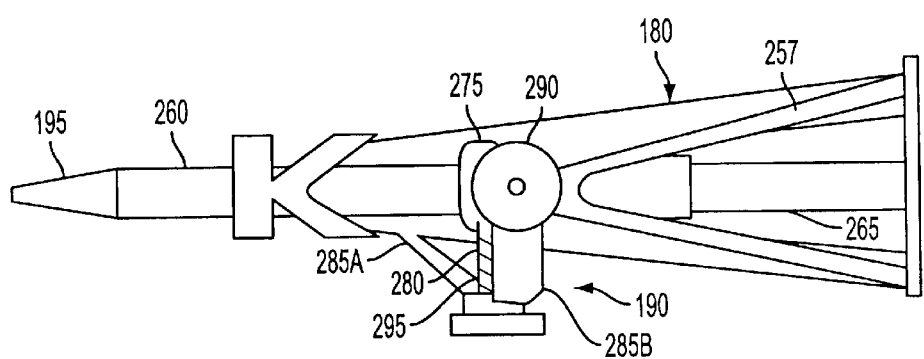
FIG. 7 is a diagrammatic illustration showing a top view of the guide assembly of FIG. 6.

FIG. 6 is a diagrammatic illustration showing a side perspective view of a guide assembly 155 according to an embodiment of the present invention. As noted above, the guide assembly 155 includes a frame/bracket 180 by which it is attached to the casing 165 of the drive mechanism 150, a wire guide 185 through which the filler wire 135 is passed, and an adjustment mechanism 190 adapted to adjust a position of a distal end or tip 195 of the wire guide relative to the tip 120 of the welding torch 115. The frame/bracket 180 includes a number of frame members 257 arranged to define a number of triangular features, thereby providing a structure that is both light and rigid. FIG. 7 is a top view of the wire guide apparatus of FIG. 6 showing another of the triangular features defined by the frame/bracket 180. The wire guide 185 includes a wire guide tube 260 and a sleeve 265 which telescopes into the wire guide tube to adjust the length of the wire guide, thereby enabling the location of the tip 195 of the wire guide relative to the welding tip 120 to be adjusted. Generally, the sleeve 265 comprises a flexible material such as nylon, PVC, plastic or mixtures thereof to enable the wire guide tube 260 to be moved from by the adjustment mechanism 190. In one preferred embodiment, the sleeve 265 is formed from a transparent or translucent material to enable an operator to monitor movement of the filler wire 135 during the welding operation. The sleeve 265 can be held in place in the wire guide tube 260 by friction (as shown), or the frame/bracket 180 can further include a locking screw (not shown) engaging and holding the wire guide tube 260 in place. Alternatively, the outer surface of the sleeve 265 can be threaded to engage threads on the internal surface of the wire guide tube 260.

In accordance with one aspect of the present invention, the adjustment mechanism 190 includes a horizontal or first adjustor 270A and a vertical or second adjustor 270B attached to the frame/bracket 180 of the guide assembly 155 to move the wire guide 185 along axes perpendicular to one another and to a longitudinal axis of the wire guide. Each of the adjustors 270A, 270B, include a gimbal 275 supporting the wire guide 185, an arm 285A or 285B attached to the frame/bracket 180 of the guide assembly 155, a threaded screw 280 attached to the gimbal and extending from the gimbal and through an opening (not shown) in the arm, and an adjusting knob 290 adapted to adjust length of the screw between the gimbal and the opening in the arm. Springs 295 maintain the screws 280 at the maximum adjusted length, and provide tension to prevent unintentional and undesired movement of the adjusting knobs 290.

Figure 8:
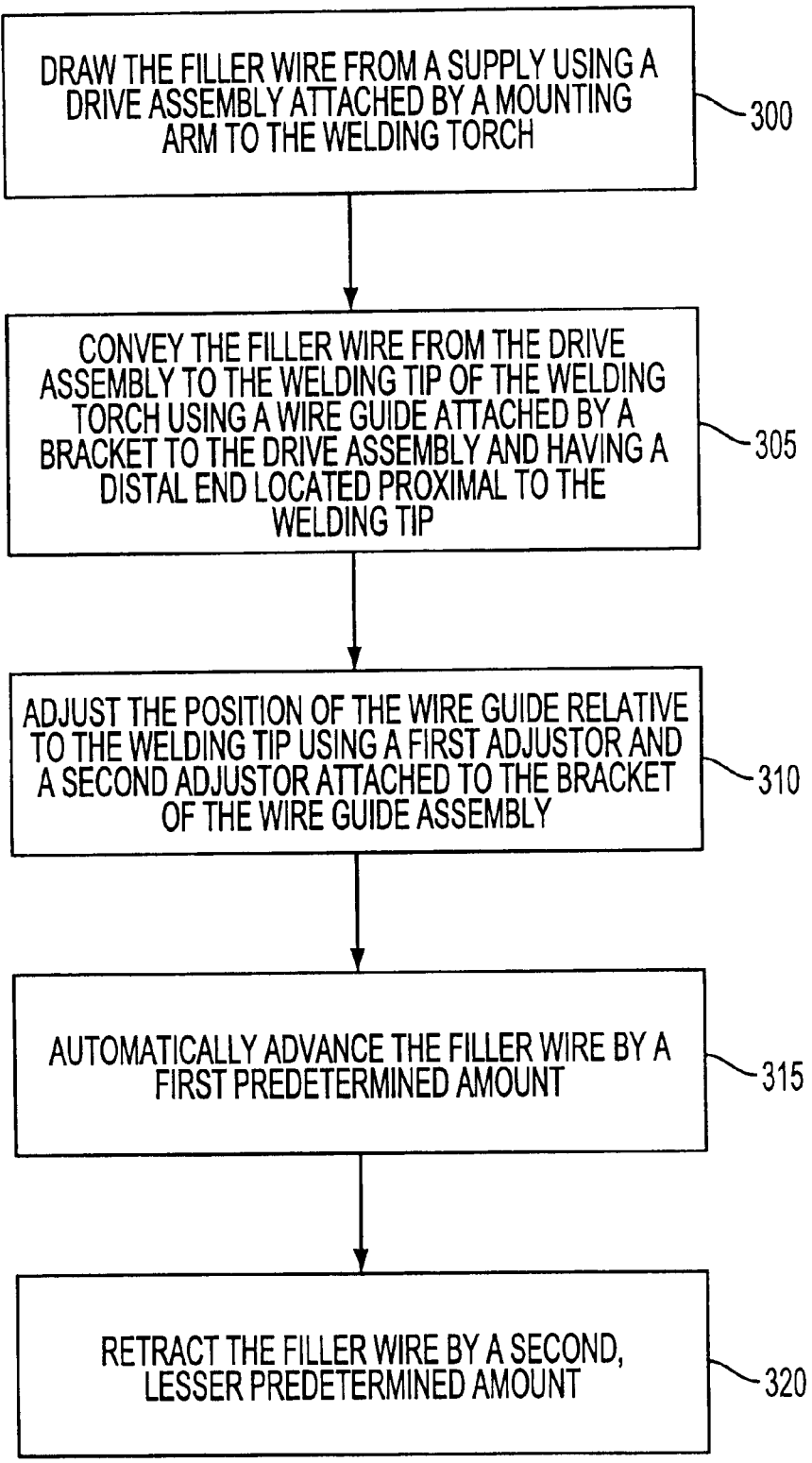
FIG. 8 is a flowchart of a method for feeding filler wire to a molten pool on a workpiece in a welding system during a welding operation according to the embodiment of the present invention.

A method or process for operating the wire guide apparatus 105 will now be described with reference to FIG. 8. FIG. 8 is a flowchart of a method for feeding filler wire 135 to a molten pool 130 on a workpiece 125 in a welding system 100 during a welding operation according to the embodiment of the present invention. The method generally involves drawing the filler wire 135 from a supply 140 using a drive mechanism 150 attached by a mounting arm 170 to a welding torch 115 on the welding system (step 300). The filler wire 135 is conveyed from the drive mechanism 150 to the molten pool 130 or a location near to a welding tip 120 of the welding torch using a wire guide 185 attached by a bracket 180 to the drive mechanism 150 and having a distal end or tip 195 located near to the welding tip (step 305). The position of the wire guide 185 relative to the welding tip 120 is then adjusted using first and second adjustors 270A, 270B, attached to the bracket 180 (step 310). Generally, the first and second adjustors 270A, 270B, are adapted to move the wire guide 185 along axes perpendicular to one another and to a longitudinal axis of the wire guide. Preferably, at least one of the adjustors 270A, 270B, include a gimbal 275 supporting the wire guide 185, an arm 285A, 285B, attached to the frame/bracket 180, a threaded screw 280 attached to the gimbal and extending from the gimbal and passing through an opening (not shown) in the arm, and an adjusting knob 290 adapted to adjust length of the threaded screw between the gimbal 275 and the opening in the arm. Thus, the step of adjusting the position of the wire guide 185 relative to the welding tip, step 310, can be accomplished by the step of turning the adjusting knobs 290.

Optionally, the wire guide apparatus 105 a further includes a controller 225 for controlling operation of the drive mechanism 150, and the method includes the further involves automatically advancing the filler wire 135 in relation with movement of the welding tip 120 over the workpiece 125. Preferably, the controller 225 is adapted to advance the filler wire 135 at a first predetermined rate, and retract the filler wire at a second, lesser predetermined rate, and the method includes the further steps of automatically advancing the filler wire at the first predetermined rate, (step 315), and retracting it at the second predetermined rate (step 320).

It is to be understood that even though numerous characteristics and advantages of certain embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the fill extent indicated by the broad general meaning of the terms in which the appended claims are expressed.

What is claimed is:

1. A wire guide apparatus for use with a welding system, the wire guide apparatus comprising:

a drive mechanism attached to a welding torch of the welding system by a mounting arm adapted to adjust a position of the drive mechanism in relation to the welding torch, the mounting arm including a first bracket attached to the welding torch and a tube member attached the drive mechanism, the tube member in sliding engagement with the first bracket to vary the position of the drive mechanism and the guide assembly relative to the welding torch, and the tube member arced to change an entry angle formed by an axis of the wire guide relative to a horizontal plane; and a guide assembly attached to the drive mechanism, the guide assembly comprising:

a second bracket by which the guide assembly is attached to the drive mechanism;

a wire guide through which the filler wire is passed, the wire guide having a distal end located proximal to a welding tip of the welding torch; and a first adjustor and a second adjustor attached to the second bracket to position the wire guide relative to the welding tip, the first adjustor and the second adjustor adapted to move the wire guide along axes perpendicular to one another and to a longitudinal axis of the wire guide.

2. A wire guide apparatus according to claim 1, wherein the drive mechanism and the guide assembly are configured to provide a centerline of the wire guide apparatus corresponding to a centerline of the welding system, whereby wobble of the wire guide apparatus during a welding operation is reduced.

3. A wire guide apparatus according to claim 1, wherein the guide assembly is configured so that the filler wire is passed in a substantially straight line from the drive mechanism to a point proximal to the welding tip of the welding torch.

4. A wire guide apparatus according to claim 1, wherein at least one of the first and the second adjustors comprise a gimbal supporting the wire guide, an arm attached to the bracket of the guide assembly, a threaded screw attached to the gimbal and extending from the gimbal and passing through an opening in the arm, and an adjusting knob adapted to adjust length of the threaded screw between the gimbal and the opening in the arm.

5. A wire guide apparatus according to claim 1, wherein the wire guide comprises a wire guide tube and a sleeve which telescopes into the wire guide tube to adjust the length of the wire guide, whereby the location of the distal end of the wire guide relative to the welding tip can be adjusted.

6. A wire guide apparatus according to claim 1, wherein the mounting arm, drive mechanism, and guide assembly are adapted to provide an entry angle of about 17 degrees in a "home" position.

7. A wire guide apparatus according to claim 1, wherein the mounting arm, drive mechanism, and guide assembly are adapted to provide entry angle of from about 10 to about 40 degrees.

8. A wire guide apparatus according to claim 1, further comprising a flexible conduit through which the filler wire is passed, the conduit extending from a location near to a filler wire supply to the drive mechanism, and wherein the wire guide apparatus further comprises a pulley assembly having a pulley attached to the drive mechanism by an articulated bracket, the pulley assembly adapted to receive the conduit from any direction and convey the conduit to the drive mechanism along a substantially straight path tangential to the pulley.

9. In a welding system having a welding torch with a welding tip for welding a workpiece, a method of feeding filler wire comprising steps of:

drawing the filler wire from a supply using a drive mechanism attached by a mounting arm to the welding torch, the mounting arm including a first bracket attached to the welding torch and an arced tube member attached the drive mechanism, the arced tube member in sliding engagement with the first bracket to vary the position of the drive mechanism and the guide assembly relative to the welding torch;

conveying the filler wire from the drive mechanism to the welding tip of the welding torch using a wire guide attached by a second bracket to the drive mechanism and having a distal end located proximal to the welding tip adjusting an entry angle formed by an axis of the wire guide relative to a horizontal plane using the arced tube member; and adjusting the position of the wire guide relative to the welding tip using a first adjustor and a second adjustor attached to the second bracket, the first adjustor and the second adjustor adapted to move the wire guide along axes perpendicular to one another and to a longitudinal axis of the wire guide.

10. A method according to claim 9, wherein the guide assembly has a substantially straight passage through which the filler wire is passed from the drive mechanism, and wherein the step of conveying the filler wire from the drive mechanism to the welding tip of the welding torch comprises the step of conveying the filler wire in a substantially straight line from the drive mechanism to the welding tip of the welding torch.

11. A method according to claim 9, wherein at least one of the first and the second adjustors comprise a gimbal supporting the wire guide, an arm attached to the bracket of the guide assembly, a threaded screw attached to the gimbal and extending from the gimbal and passing through an opening in the arm, and an adjusting knob adapted to adjust length of the threaded screw between the gimbal and the opening in the arm, and wherein the step of adjusting the position of the wire guide relative to the welding tip comprises the step of turning the adjusting knob.

12. A wire guide apparatus for use with a welding system, the wire guide apparatus comprising:

drive means for moving weld wire from a weld wire supply to a location proximal to a welding tip of a welding torch, the drive means attached to the welding torch of the welding system by a mounting arm adapted to adjust a position of the drive means in relation to the welding torch;

guide means for positioning the wire guide relative to the welding tip, the guide means attached to the drive means;

adjustment means for adjusting the position of the wire guide relative to the welding tip; and wherein the mounting arm includes a first bracket attached to the welding torch and a tube member attached the drive means, the tube member in sliding engagement with the first bracket to vary the position of the drive means and the wire guide relative to the welding torch, and the tube member arced to change an entry angle formed by an axis of the wire guide relative to a horizontal plane.

13. A wire guide apparatus according to claim 12, wherein the guide means comprises a wire guide through which the filler wire is passed, the wire guide attached by a second bracket to the drive means and having a distal end located proximal to a welding tip of the welding torch.

14. A wire guide apparatus according to claim 13, wherein the adjustment means comprises a first adjustor and a second adjustor attached to the second bracket to position the wire guide relative to the welding tip, the first adjustor and the second adjustor adapted to move the wire guide along axes perpendicular to one another and to a longitudinal axis of the wire guide.

15. A wire guide apparatus according to claim 12, wherein at least one of the first and the second adjustors comprise a gimbal supporting the wire guide, an arm attached to the second bracket, a threaded screw attached to the gimbal and extending from the gimbal and passing through an opening in the arm, and an adjusting knob adapted to adjust length of the threaded screw between the gimbal and the opening in the arm.

16. A wire guide apparatus for use with a welding system, the wire guide apparatus comprising:

a drive mechanism attached to a welding torch of the welding system;

a guide assembly attached to the drive mechanism, the guide assembly comprising:

a second bracket by which the guide assembly is attached to the drive mechanism;

a wire guide through which the filler wire is passed, the wire guide having a distal end located proximal to a welding tip of the welding torch; and a first adjustor and a second adjustor attached to the bracket of the guide assembly to position the wire guide relative to the welding tip, the first adjustor and the second adjustor adapted to move the wire guide along axes perpendicular to one another and to a longitudinal axis of the wire guide; and a flexible conduit through which the filler wire is passed, the conduit extending from a location near to a filler wire supply to the drive mechanism, and wherein the wire guide apparatus further comprises a pulley assembly having a pulley attached to the drive mechanism by an articulated bracket, the pulley assembly adapted to receive the conduit from any direction and convey the conduit to the drive mechanism along a substantially straight path tangential to the pulley.

17. In a welding system having a welding torch with a welding tip for welding a workpiece, a method of feeding filler wire comprising steps of:

drawing the filler wire from a supply using a drive mechanism attached by a mounting arm to the welding torch, and a pulley assembly having a pulley attached to the drive mechanism by an articulated bracket, the pulley assembly adapted to receive a flexible conduit through which the filler wire is passed from any direction and convey the conduit to the drive mechanism along a substantially straight path tangential to the pulley;

conveying the filler wire from the drive mechanism to the welding tip of the welding torch using a wire guide attached by a bracket to the drive mechanism and having a distal end located proximal to the welding tip; and adjusting the position of the wire guide relative to the welding tip using a first adjustor and a second adjustor attached to the bracket of the guide assembly, the first adjustor and the second adjustor adapted to move the wire guide along axes perpendicular to one another and to a longitudinal axis of the wire guide.

* * * * *